United States Patent [19]
Tseng et al.

[11] Patent Number: 5,960,668
[45] Date of Patent: Oct. 5, 1999

[54] INDEXING MECHANISM USING PAIRS OF RADIALLY DISPOSED ROLLERS ENGAGED BETWEEN ADJACENT CAM RIBS

[75] Inventors: Ching-Huan Tseng; Wei-Han Wang, both of Jwu, Taiwan

[73] Assignee: National Science Council, Taipei, Taiwan

[21] Appl. No.: 08/736,768

[22] Filed: Oct. 25, 1996

[51] Int. Cl.$^6$ .................................................. F16H 27/04
[52] U.S. Cl. ............................ 74/84 R; 74/444; 74/450; 74/465
[58] Field of Search .................................. 74/84 R, 409, 74/439, 440, 444, 450, 465

[56] References Cited

U.S. PATENT DOCUMENTS

| | | | |
|---|---|---|---|
| 2,789,683 | 4/1957 | Stahl | 74/84 |
| 3,456,529 | 7/1969 | Petroff. | |
| 3,496,791 | 2/1970 | Gabriel | 74/84 |
| 3,710,639 | 1/1973 | Reene | 74/393 |
| 4,541,297 | 9/1985 | Fujita | 74/465 X |
| 4,685,346 | 8/1987 | Brackett | 74/440 X |
| 4,747,321 | 5/1988 | Hannel | 74/440 |

OTHER PUBLICATIONS

Oizumi, et al., A Globoidal–Cam Type Gearing, DE–vol. 43–2, International Power Transmission and Gearing Conference—vol. 2, ASME 1992.

*Primary Examiner*—Charles A. Marmor
*Assistant Examiner*—David Fenstermacher
*Attorney, Agent, or Firm*—Smith, Gambrell & Russell, LLP; Beveridge, DeGrandi, Weilacher & Young Intellectual Property Group

[57] ABSTRACT

A roller gear cam index mechanism including a turret having pairs of adjacent rollers radially arranged on a circumference thereof. Each pair of rollers is engaged between adjacent ribs on a globoidal cam. The angle between the line up direction of every pair of rollers and the tangent direction of the turret circumference is a variable between 0 to 90 degrees. The rollers are modified globoidal rollers which are selected having difference maximum radii and vertex positions.

8 Claims, 7 Drawing Sheets

$0° < \theta < 90°$

INDEXING MECHANISM USING PAIRS OF RADIALLY DISPOSED ROLLERS ENGAGED BETWEEN ADJACENT CAM RIBS

FIELD OF INVENTION

This invention relates to an improvement of the roller gear cam index mechanism. This invention improves the arrangement and the geometry design of conventional cylindrical rollers. The accuracy and stability of the index mechanism is improved by the newly arranged and designed rollers. When the geometrically modified rollers are in mesh with the ribs, both the contact condition and the preload between each engaged roller and rib can be adjusted. This improvement decreases the non-uniform surface wear between the rollers and the ribs, and increases the life of the index mechanism.

BACKGROUND OF THE INVENTION

Figure 1:
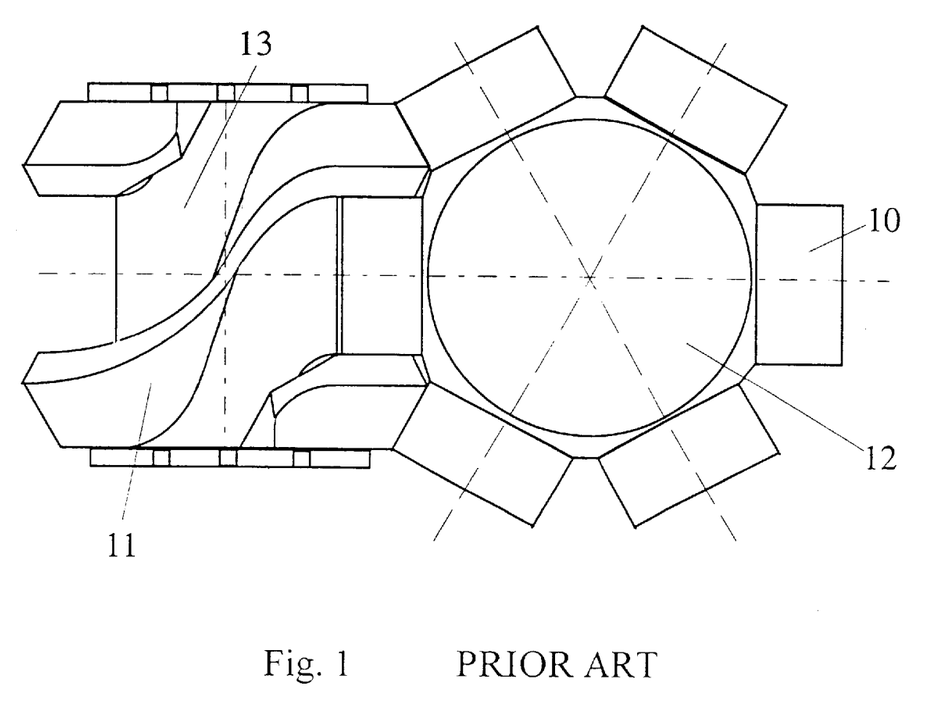
FIG. 1 illustrates an example of conventional roller gear cam index mechanism.

In FIG. 1, a conventional index mechanism is shown and is a one indexing-type roller gear cam mechanism which utilizes cylindrical rollers 10 radially arranged on the turret and one or more ribs 11 on a globoidal cam 13. A linear rotation on the input axis of the cam generates intermittent and indexing motion on the output axis of the turret 12. In some applications, the automatic tool changer (ATC) of a CNC machine employs the roller gear cam of a spatial cam mechanism to change cutting tools. This kind of mechanism can also be utilized in an automatic feed apparatus and in various other automatic manufacturing devices.

When the axis of the globoidal cam rotates at constant speed, some of the rollers radially arranged on the turret will engage the side-wall of the rib. The linear rotation on the input axis will therefore be transferred into a dwell or an index motion on the output axis of the turret. If the rib is straight i.e., straight with reference to a base circle defined around the cam axis), the turret will remain stationary. This is called the dwell period. A mechanism fixed on the output axis can, for example, finish a necessary machining operation within the dwell period. After the dwell period, if the rib is helical, the engaged rollers travels along the rib and makes the turret rotate a predetermine angle. This is called the index period. Within the index period, the mechanism fixed on the output axis is rotated to the next dwell position and then the next or the same machining operation can be performed. When a roller leaves the rib, another one comes into contact with that or a different rib, i.e., it is meshed with the rib. This is the operating sequence of the roller gear cam index mechanism.

In order to ensure a better meshing condition between all of the presently engaged rollers and the ribs, yield an accurate transmission of motion, and decreases the wear on the contact surfaces of the engaged rollers and ribs, the roller gear cam index mechanism usually has an eccentric ring on the input axis of the globoidal cam for adjustable assembly of the mechanism. Thus, the distance between two central axes of the mechanism can be adjusted when it is assembled. A better contact condition between the engaged rollers and ribs can be obtained. Meanwhile, the eccentric ring also is used in adjusting the suitable preload to avoid separation or extreme contact stress between the engaged rollers and ribs during actual use.

In the conventional roller gear cam index mechanism, which has been well known and used, there still exists some inherent shortcomings:
1. The conventional mechanism is not highly accurate or stable.

When any particular roller travels between two adjacent ribs, two ribs will be alternately disposed among three rollers. The second (middle) roller will be simultaneously jammed into the side-walls of two adjacent ribs, as shown in FIG. 1. In order to avoid such a jamming effect, the second roller must only touch a side-wall of one of the ribs or not at all.

However, this reduces the accuracy and stability of the mechanism.

2. The second roller contacts one side-wall of one rib and then another, causing unexpected wear. When any engaged roller travels from one side-wall of a rib to another when between two adjacent ribs, the rotational direction of this roller reverses. Because the roller gear cam index mechanism operates at high speed, the reversed rotation of the roller quickly causes wear between the roller and the rib. This decreases the life of the mechanism.

3. There is no guarantee that the meshing condition in each index period can be correctly adjusted.

The ideal contact condition between one engaged cylindrical roller and the rib is line contact. Some manufacture and assembly errors, however, will make the intended line contact become edge contact between the engaged rollers and the ribs. Because just the edges of the engaged rollers and the ribs are in contact noise, vibration, and extremely high contact stress in these contact regions results which will decrease the life of the mechanism. In order to avoid this ill contact condition, an eccentric ring is used to adjust the contact condition between the engaged rollers and the ribs. However, a better contact condition can be only determined in this manner when the turret rotates to a given position. Since each roller on the turret will contact the same rib in series, the contact conditions between these other rollers and ribs can not be guaranteed. Thus by using the eccentric ring, the meshing condition in each index period can not be correctly adjusted at the same time. In addition, another function of the eccentric ring is to adjust the preload condition. This function conflicts with that of setting contact conditions because it is hard to adjust the contact condition and the preload condition by using a same eccentric ring at the same time.

4. The preload condition between the turret and the globoidal cam in each index period can not be suitably adjusted.

In order to ensure proper preload condition between the turret and the globoidal cam, the distance between two rotation axes of the said mechanism can be adjusted to provide suitable preload by an eccentric ring on the output axis. The suitable preload, however, can be only adjusted when the turret rotates to a given position. Because of manufacturing and assembly errors, the preload condition between the turret and the globoidal cam in each indexing period can not be suitably adjusted. Thus, a comprised distance between the two rotation axes of the mechanism is used to provide better preload for all indexing periods. Because the relative distance is not the same as that which was originally designed, the accuracy of this mechanism is decreased. Further, as was mentioned in part 3, another function of the eccentric ring is to adjust the contact conditions between all engaged rollers and ribs. These two functions conflict with each other because it is hard to adjust the contact condition and the preload condition by using the same eccentric ring at the same time.

Tetusya Oizumi & Co. at the ASME conference in 1992 submitted the globoidal-cam worm gearing transmission assemblage. The roller-wheel of the worm gearing transmission assemblage enables more rollers to be installed. This could achieve the goal of adjusting the preload condition.

Although the globoidal-cam has the benefit of no backlash, the objective for using the rollers is to replace the tooth surfaces of the worm gear. The said cam changes the phase angle between the upper and lower roller wheels to provide the preload. A set of rollers on each wheel will overlap and become a pair of roller wheels. When adjusting the preload between the engaged rollers and the ribs, the position of the central axis of each roller has been changed. The meshing condition between each engaged roller and rib is not the same as the ideal condition.

Robert J. Petroff & Co in 1969 obtained U.S. Pat. No. 34,565,929. In their patent claim, they changed the curvatures of the rollers and ribs to change the meshing condition from the original line contact to point contact. Because the radius and the way of line up are not changed, the above four mentioned defects can not be avoided.

SUMMARY OF THE INVENTION

In order to overcome the above stated shortcomings, this invention has been conceived. A main purpose of this invention is to use a pair of adjacent rollers to replace each equally arranged cylindrical roller on the turret. Th adjacent inner sides of these two rollers will not come into contact with any rib, while the outside of each roller meshes the side-wall of the rib.

Another feature of the present invention is a new roller geometry. A modified globoidal roller with a different maximum radius and vertex position replaces each cylindrical roller on the turret, thereby improving the conventional roller gear cam index mechanism.

The benefits of this invention are:

1. An increase in the accuracy and the stability of the mechanism.
2. An improvement in the contact conditions between all engaged rollers and ribs because each is adjustable. This reduces the contact stress and wear on the contact surfaces of the engaged rollers and ribs, and increases the life of the mechanism.
1. An improvement in the preload between the turret and the globoidal cam in the mechanism.

Figure 2A:
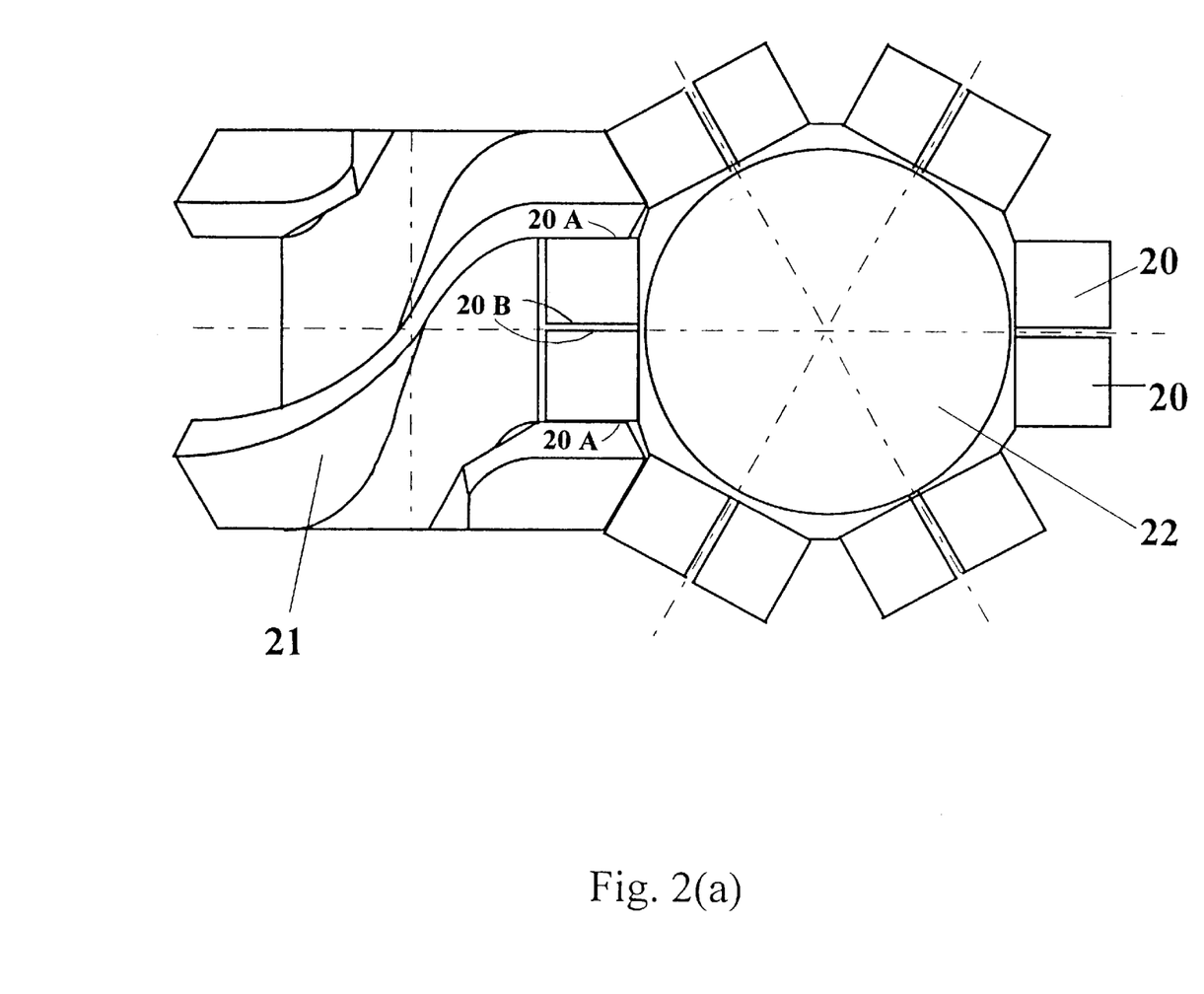
FIGS. 2(a)–2(c) illustrates the roller gear cam index mechanism of the present invention.
Figure 2B:
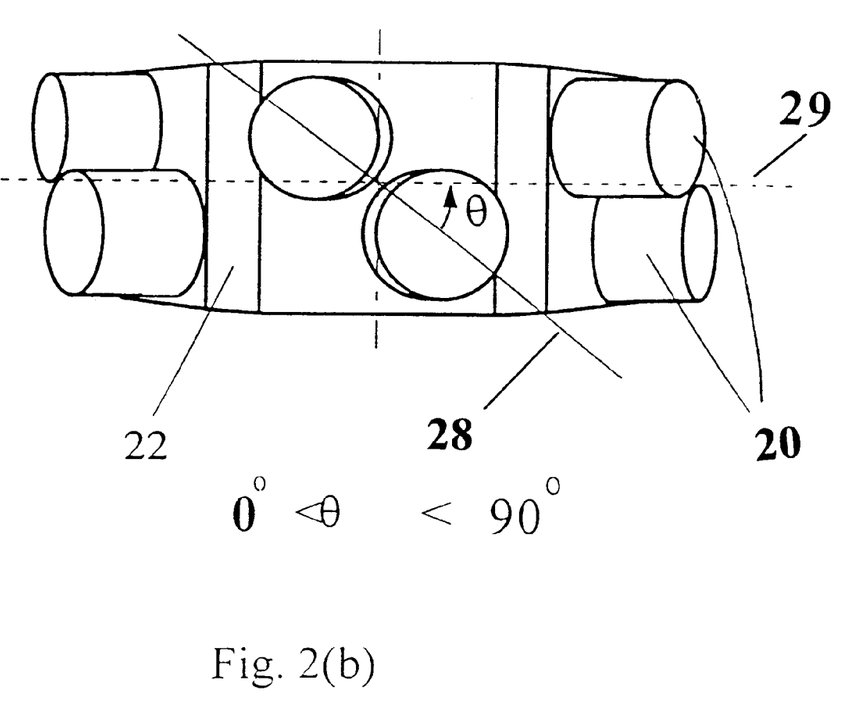
Figure 2C:
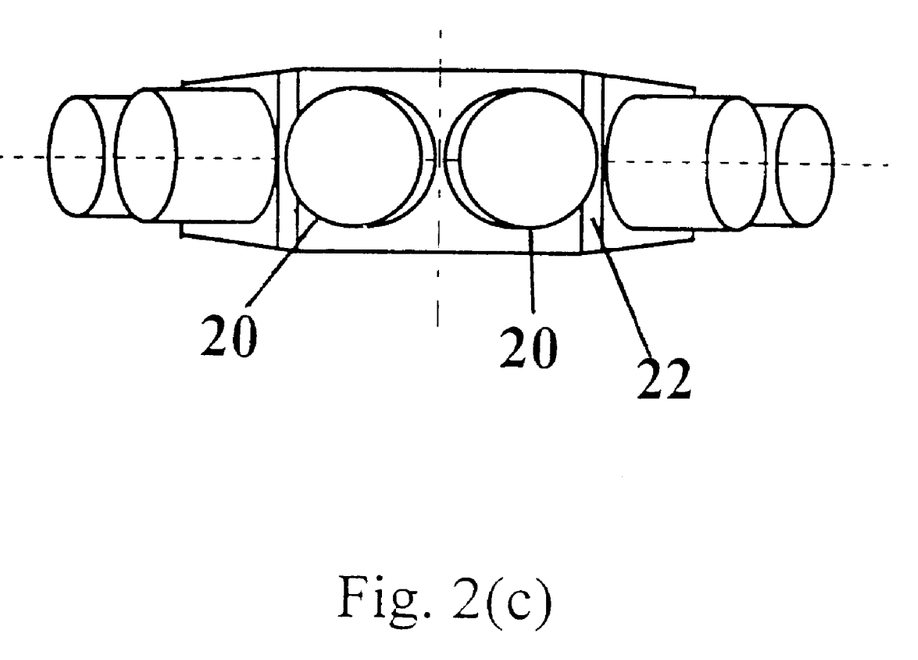

This invention improves the above-stated first shortcoming, namely, that the conventional cam mechanism does not provide accuracy or stability. Please refer to FIG. 2. Each roller which would normally be situated on the conventional turret is replaced by a pair of adjacent rollers 20 of smaller diameter. A pair of adjacent rollers 20 therefore will travel between two adjacent ribs 21. The outer sides 20A of the rollers 20 contact with the inner side-walls of two adjacent ribs. At this moment, each engaged rib is held by the two rollers in a stable manner. The disadvantage of a single roller traveling between two ribs decreasing the accuracy and stability of the mechanism is avoided. Thus, this invention offers better accuracy and stability than conventional mechanisms and improves the previously mentioned first shortcoming.

The above-stated second shortcoming, namely, that the reversed rotation of a roller will cause wear on the contact surfaces is avoided by this invention. As shown in FIG. 2, every engaged roller 20 only contacts a side-wall of one rib 21 throughout the entire index period. In contrast, an engaged roller in the conventional design travels from one side-wall of a rib to another while between two adjacent ribs. The rotational direction of this roller therefore will be reversed and quickly cause wear on the contact surfaces of the roller and the rib. This decreases the life of the mechanism. This new design effectively overcomes this drawback and prolongs the life of the mechanism.

Figure 3A:
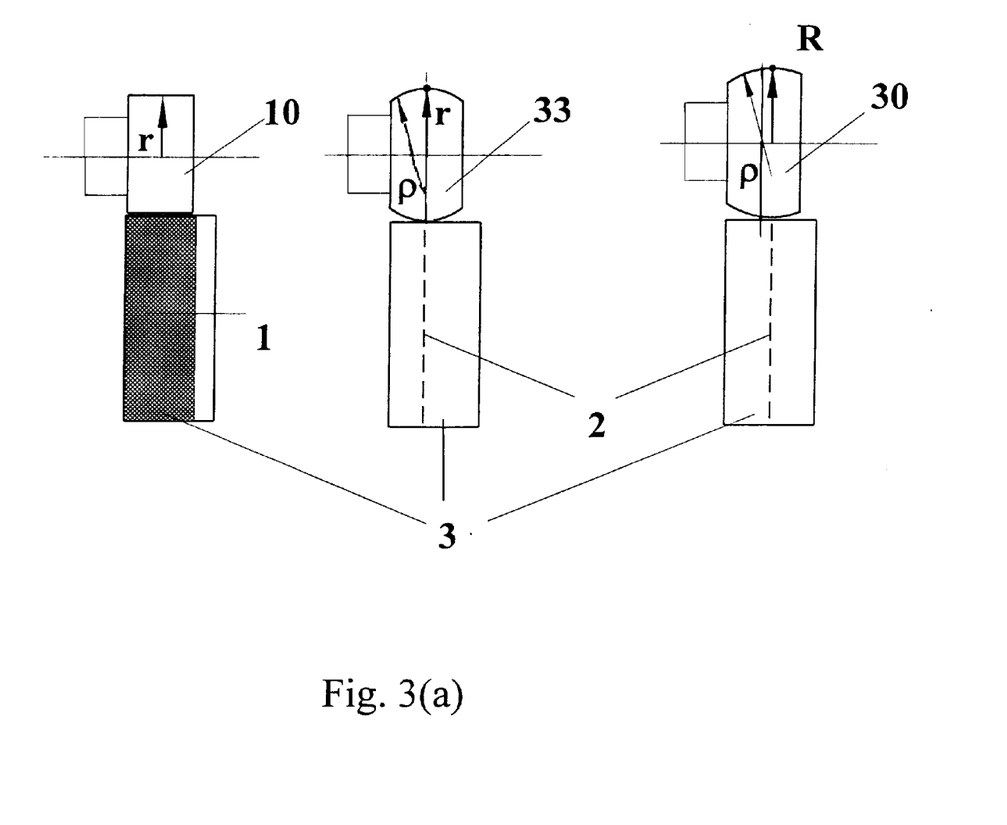
FIGS. 3(a) and 3(b) illustrate different contact conditions between the engaged roller and rib and the contact paths on the cam rib caused by contact points; respectively.
Figure 3B:
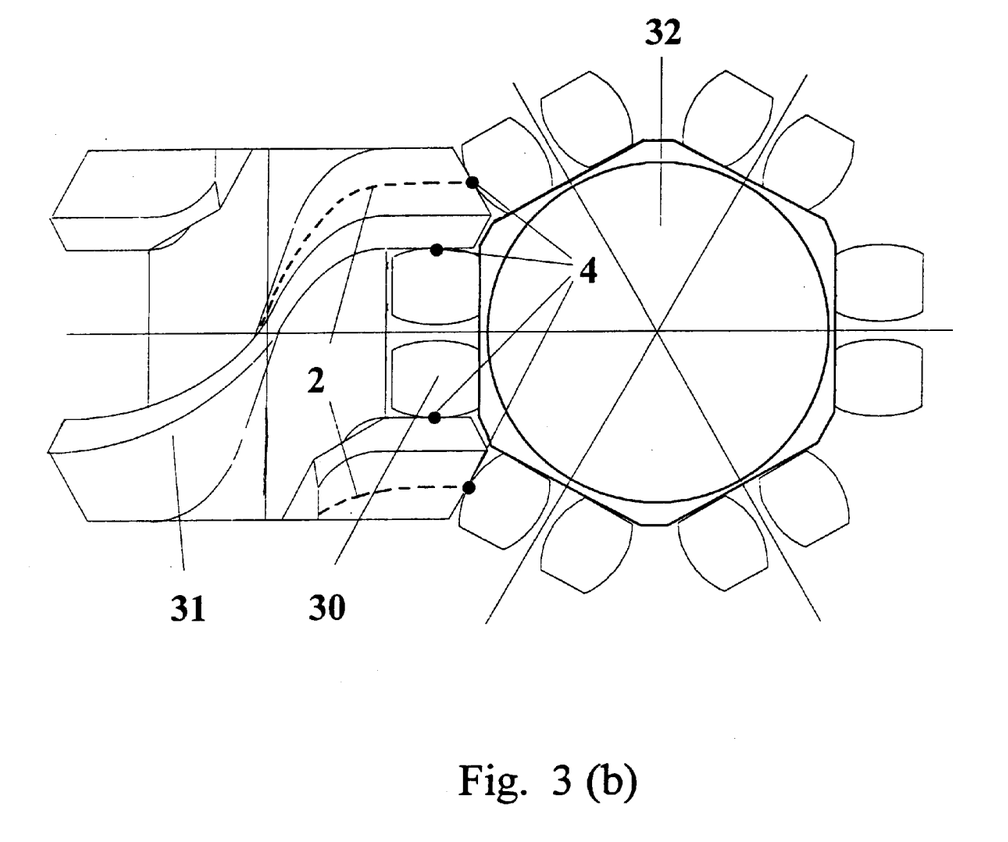

The present invention also improves the above-stated third defect, namely, that the meshing condition in each index period can not be correctly adjusted. In FIGS. 3(a) and 3(b), all the cylindrical rollers 10 of the mechanism on the turret 32 have been replaced with globoidal rollers according to the present invention. The line contact between the engaged roller and rib becomes point contact 4. The contact plane of the cylindrical roller 10 is indicated by reference numeral 1, while the contact path of the globoidal 33 and the modified globoidal 30 rollers is indicated by reference numeral 2. The radius of the cylindrical roller 10 is constant along the axial direction. Because the globoidal roller 33 has a crowned surface, its radius is smaller on both sides and the maximum is in the middle along the axial direction. When the globoidal roller and the rib 33 are meshed, the contact point 4 will be located around the roller surface where the radius is maximum. The contact point 4 should be located at the center of the rib side-wall 3 that causes an ideal contact path for the best action.

In industrial applications, some manufacture and assembly errors exist, resulting in the contact path not being kept along third central region of the rib side-wall 3. If the contact point 4 reaches the edges of the roller and rib, edge contact occurs. Edge contact increases the wear and decreases the life of the mechanism.

The greatest benefit of the modified globoidal roller 30 is that the contact point 4 between the engaged roller and rib 31 can be controlled. The contact point can be adjusted by choosing a modified globoidal roller 30 with different vertex position. This design provides a way to control the contact path by altering the surface geometry of the roller. The contact path therefore can be adjusted to be closer to the ideal path. Besides, this modified design can be used to individually adjust each roller on the turret 32 when engaging with the rib 31. Each contact path 4 can be controlled to achieve the best contact condition.

The modified globoidal roller 30 is superior to conventional globoidal roller because it provides a means of controlling the contact path. When it is assembled in the cam mechanism, a controllable contact path between each engaged roller and rib is created along the contact points 4. In other words, all the contact points 4 can be located at suitable positions by choosing a roller with a suitable vertex position. The new cam mechanism is thus far more tolerant of manufacture and assembly errors. Edge contact that causes high contact stress and wear can be avoided. This invention therefore replaces the function of the eccentric ring by using the modified globoidal rollers 30 to adjust the contact condition, and thus improves the above stated shortcomings.

Figure 4:
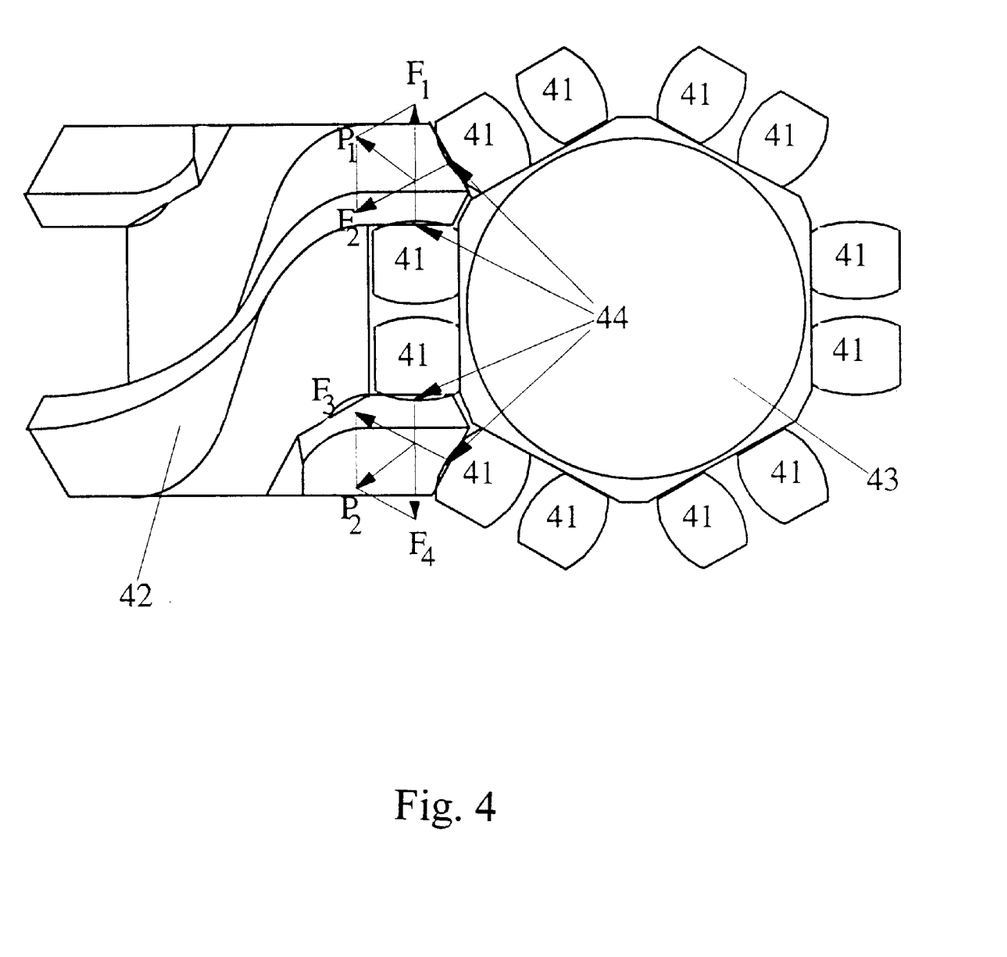
FIG. 4 illustrates the preload forces caused by the larger radius of the engaged rollers.

The present invention also overcomes the above-stated fourth shortcoming, namely, that the preload between the turret and the globoidal cam in each index period can not be suitably adjusted. FIG. 4 shows a variation of the mechanism shown in FIG. 3. This variation alleviates the need to use an eccentric ring to adjust the preload condition. This variation also simultaneously achieves the function of adjusting the contact condition. In order to keep proper preload between the turret and the globoidal cam, conventional mechanisms use an eccentric ring to adjust the relative position between the input and output axes of the said mechanism. The eccentric ring is also used to adjust the contact condition between the engaged rollers and the ribs. It is hard to adjust the contact condition and the preload condition by using a same eccentric ring at the same time.

As has been previously explained in an embodiment of the present invention, every roller on a conventional roller wheel turret is replaced with a pair of adjacent rollers. Thus, any engaged rib will be meshed with two rollers, that is, an engaged rib is stably held by two rollers. Based on a variation of this principle, we have replaced the two engaged rollers with modified globoidal rollers having suitable maximum radii to provide proper preload. A higher or lower preload will be produced when the rollers with larger 41 or smaller 40 maximum radii are selected, thereby achieving adjustability of the preload. For example, when the rollers of the larger radii 41 are assembled, the space between pairs of these rollers become narrow. If the rollers and the rib 42 occupy the same space at the contact region, imaginary interference 44 will be exhibited. As imaginary interference does not exist in the real world, the rollers and the rib 42 will push away from each other. When the rib 42 passes through the narrow space, thrust forces $F_i(i=1\sim4)$ between each engaged roller and rib 42 will be produced. The combined effect of two thrust forces located on both side-walls of the rib 42, yield a preload force $P_i(i=1\sim2)$ between the bases, the turret 43 and the globoidal cam, of the engaged rollers and rib 42.

In a conventional design, the relative distance between two rotation axes of the mechanism is changed to adjust the preload. Because the relative distance is not the same as the original design, the accuracy of this mechanism is decreased. In the present invention, the mechanism does not change the relative distance between two central axes of the mechanism, so it is more accurate than the conventional design. This preload condition is adjusted when every pair of rollers engages the rib one after one. This will overcome the above-stated fourth shortcoming that the preload can not be suitably adjusted in each index period.

This invention is an improvement of the conventional roller gear cam index mechanisms. It comprises the following parts: one or more ribs on a globoidal cam, several pairs of adjacent rollers radially arranged on the circumference of a turret. The angle between the line up direction 28 (FIG. 2(*b*)) of every pair of rollers and the tangent direction 29 (FIG. 2(*b*)) of the turret circumference can be from 0 to 90 degrees. The present invention is able to increase the accuracy and the stability of the index mechanism so as to prolong its life. The larger maximum radius of each modified globoidal roller can be chosen to provide a suitable preload between the turret and the globoidal cam.

This modified invention represents a sophisticated design. It will increase the accuracy and stability of the roller gear cam index mechanism, so as to make extension of the life and be more market competitive. This invention will be of great benefit to industry.

The foregoing explanation merely represents the best example of the roller gear cam index mechanism. Anyone who is acquainted with this invention and who has technical knowledge in this field would be able to modify the example given. Thus, the given example is not intended and should not be used to limit the scope or spirit of the invention as is defined in the appended claims.

What we claim is:

1. An indexing mechanism, comprising:

a rotatable cam;

a plurality of ribs extending from said cam, two adjacent ribs defining a groove therebetween;

a turret member; and a plurality of rollers spaced circumferentially about said turret member, said rollers being arranged on said turret member in roller pairs, each roller pair being circumferentially offset about said turret member from adjacent roller pairs, and said roller pairs and said groove being operationally dimensioned and arranged such that said roller pairs are received in said groove.

2. The indexing mechanism defined in claim 1, wherein:

an outer portion of each roller in said roller pair respectively engages a side wall of each rib defining said groove, and interior portions of each roller in said roller pair are adjacent and not engaged with any portion of said ribs.

3. The indexing mechanism defined by claim 1, wherein:

outer portions of each roller in said roller pair disposed in said groove contacts a sidewall of each curved rib, respectively, and inner portions of each roller in said roller pair disposed in said groove do not contact any portion of said curved ribs thereby allowing each roller in said roller pair disposed in said groove to move independently under the influence of said outer portions respectively contacting said sidewall of each curved rib.

4. The indexing mechanism defined by claim 3, wherein:

said rollers are cylindrical rollers.

5. The indexing mechanism defined by claim 4, wherein:

at least two of said rollers are modified globoidal rollers having different maximum radius and vertex positions.

6. The indexing mechanism defined by claim 5, wherein:

each modified globoidal roller contacts sidewalls of said ribs at a different contact points due to said different maximum radius and vertex positions of said modified globoidal rollers.

7. The indexing mechanism defined by claim 3, wherein:

said rollers are globoidal rollers.

8. The indexing mechanism defined by claim 3, wherein:

at least one of said rollers is a modified globoidal roller.

* * * * *